(12) United States Patent
Brown et al.

(10) Patent No.: US 7,431,242 B1
(45) Date of Patent: Oct. 7, 2008

(54) RE-ENTRY VEHICLE SHAPE FOR ENHANCED PERFORMANCE

(75) Inventors: James L. Brown, Cupertino, CA (US);
Joseph A. Garcia, Belmont, CA (US);
Dinesh K. Prabhu, Fremont, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 151 days.

(21) Appl. No.: 11/265,324

(22) Filed: Nov. 1, 2005

(51) Int. Cl.
*B64G 1/62* (2006.01)
(52) U.S. Cl. .................................. 244/158.9
(58) Field of Classification Search ............... 244/158.1, 244/158.9, 171.7
See application file for complete search history.

(56) References Cited

U.S. PATENT DOCUMENTS 4,903,918 A 2/1990 Park et al.

OTHER PUBLICATIONS

Allen, Hypersonic Flight and the Re-Entry Problem, Journal of the Aeronautical Sciences, Apr. 1958, 217-229 and 262, 25-4, Institute of The Aeronautical Sciences, Inc.
Allen, et al., A Study of the Motion and Aerodynamic Heating of Ballistic Missiles Entering the Earth's Atmosphere at High Supersonic Speeds, NACA-TR-1381, Apr. 1953.
Cheatwood, et al., Geometrical Description for a Proposed Aeroassist Flight Experiment Vehicle, NASA TM 87714, Jul. 1986, NASA Langley Research Center.
Eggers, Performance of Long Range Hypervelocity Vehicles, Jet Propulsion, Nov. 1957, 1147-1151, 27-11, American Rocket Society.
Eggers, et al., A Comparative Analysis of the Performance of Long-Range Hypervelocity Vehicles, NACA-TR-1382, Dec. 1954.
Ferri, et al., The Use of Lift of Re-entry from Satellite Trajectories, Jet Propulsion, Nov. 1957, 1184-1191, 27-11, American Rocket Society.
Lee, et al., Heat-Transfer Rate and Pressure Measurements Obtained During Apollo Orbital Entries, NASA TN-D-6028, Oct. 1970, NASA, Washington, D.C.
Mitcheltree, et al., Aerodynamics of Stardust Sample Return Capsule, AIAA, Jun. 1997, 697-707, AIAA, Inc.
Nolte, et al., Probing a Planetary Atmosphere: Pioneer Venus Spacecra . . . , AIAA/AGU Conference on the Exploration of the Outer Planets, Sep. 17-19, 1975, St. Louis, MO.
Walberg, A Survey of Aeroassisted Orbit Transfer, Journal of Spacecraft and Rockets, Jan. 1985, 3-18, 22-1, AIAA and ADAST.
Wright, et al., Survey of Afterbody Aeroheating Flight Data for Planetary Probe Thermal Prot . . . , 38th AIAA Thermophysics Conference, Jun. 6-9, 2005, Toronto, Ontario Canada.

*Primary Examiner*—Tien Dinh
(74) *Attorney, Agent, or Firm*—John F. Schipper; Robert M. Padilla (57) ABSTRACT

A convex shell structure for enhanced aerodynamic performance and/or reduced heat transfer requirements for a space vehicle that re-enters an atmosphere. The structure has a fore-body, an aft-body, a longitudinal axis and a transverse cross sectional shape, projected on a plane containing the longitudinal axis, that includes: first and second linear segments, smoothly joined at a first end of each the first and second linear segments to an end of a third linear segment by respective first and second curvilinear segments; and a fourth linear segment, joined to a second end of each of the first and second segments by curvilinear segments, including first and second ellipses having unequal ellipse parameters. The cross sectional shape is non-symmetric about the longitudinal axis. The fourth linear segment can be replaced by a sum of one or more polynomials, trigonometric functions or other functions satisfying certain constraints.

16 Claims, 7 Drawing Sheets

ACV

Apollo

RE-ENTRY VEHICLE SHAPE FOR ENHANCED PERFORMANCE

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to the determination of an optimal shape for an atmospheric entry vehicle and the means by which this is accomplished.

BACKGROUND OF THE INVENTION

A vehicle entering the atmosphere of a planet will do so at hypersonic speeds. The vehicle will need to decelerate and maneuver through that atmosphere while protecting its payload from excessive heating. As a consequence, the design of the vehicle shape so as to provide optimal aerodynamic lift and drag properties while minimizing convective and radiative heating to the vehicle outer surfaces is critical to its survival and performance. Optimizing the aerodynamic performance of such a vehicle allows greater latitude in choice of entry trajectory and timing, while minimizing heating levels may provide a greater choice of thermal protection materials and allow minimization of thermal protection system weight, thereby allowing greater payload and maximizing the probabilities of survival.

Two types of atmospheric entry shapes are in current use: winged and blunt-body. Blunt body shapes allow lower construction and maintenance costs and have proven more robust than winged shapes. However, blunt body atmospheric entry vehicles also tend to provide lower aerodynamic performance (e.g., net lift) than do winged shapes. Blunt bodies to date have been primarily simple geometric symmetric shapes, such as the Apollo shape which has a circular/torus symmetric cross-section heat shield, or the 70 degree sphere-cone heat shield such as typically used for many Mars missions.

Improvement of the aerodynamic performance of blunt body entry vehicles is highly desirable to allow a wider entry corridor, to allow greater cross-range capability for landing at a desired location, and to provide additional, favorable impacts on mission operations.

Blunt body atmospheric entry vehicles tend to consist of a heat shield fore-body, which faces the wind and encounters the high levels of heating associated with entry, and an aft-body section, which covers the payload region. Particularly at hypersonic speeds, Mach 5 and above, the fore-body heat shield design, including its shape, is critical in establishing the aerodynamic and aerothermal performance of the vehicle.

What is needed is a shape for a shell structure for a re-entry vehicle that, during atmospheric entry, generates near-optimal associated lift forces and has improved heat transfer and pressure characteristics. Preferably, the shape should be convex and should be describable by a relatively small number of geometric parameters that can be varied, during design of the optimal shape for the expected environment.

SUMMARY OF THE INVENTION

These needs are met by the invention, which provides a convex structure, having a continuous slope, which is described in one cross sectional view by four linear segments and six curvilinear segments, joined together to provide a convex shape defined by nine parameters. Viewed parallel to the y-axis in a Cartesian coordinate system, the projected cross sectional shape includes first and second linear segments, L1 and L2, spaced apart from each other and located on opposite sides of an x-axis, with each of the first and second segments being oriented substantially at a selected non-zero angle $\theta_c$ relative to the x-axis, each segment having a first segment end of closest approach to the x-axis, with each closest approach segment end being located at substantially the same distance $R_m$ from the x-axis. The projected shape includes a third linear segment L3, oriented substantially perpendicular to the x-axis adjacent to the end of closest approach to the x-axis for each of the first and second linear segments, L1 and L2. First and second curvilinear segments, C1 and C2 (preferably sectors of circles), tangent to the first and third segments, L1 and L3, and tangent to the second and third segments, L2 and L3, respectively, connect the third linear segment L3 to the first linear segment L1 and connect the third linear segment L3 to the second linear segment L2. Third and fourth curvilinear segments, C3 and C4, are positioned tangent to a second end of the first linear segment L1 and tangent to a second end of the second linear segment L2, respectively.

A fourth linear segment L4 is preferably oriented at a non-zero, non-perpendicular angle relative to the x-axis and is spaced apart from the first and second linear segments, L1 and L2. A fifth curvilinear segment C5 is positioned tangent to a second end of the third curvilinear segment C3 and tangent to a first end of the fourth linear segment L4. A sixth curvilinear segment C6 is positioned tangent to a second end of the fourth curvilinear segment C4 and tangent to a second end of the fourth linear segment L4.

The present invention is a blunt body atmospheric vehicle which includes a fore-body heat shield and an aft-body, each described separately but which meet at the maximum diameter of the vehicle.

The fore-body portion of the structure includes the fifth and sixth curvilinear segments, C5 and C6, and the fourth linear segment L4; the first, second and third linear segments, L1, L2 and L3, and the first, second, third and fourth curvilinear segments, C1, C2, C3 and C4, are part of the aft-body shape, which includes a truncated cone that is substantially cylindrically symmetric about the x-axis.

The fore-body portion of the structure, viewed parallel to the z-axis, as a sequence of slices ($z=z_n$; $n=0, \ldots, N$) includes sectors of ellipses (projected as fifth and sixth curvilinear segments, C5 and C6) with suitable lengths of ellipse semi-major axis and ellipse semi-minor axis, joined with sectors of circles (projected as third and fourth curvilinear segments, C3 and C4) with suitable radii.

The present invention provides an improvement over prior blunt body shapes in that the shape is actually a class of geometric shapes that is describable by a relatively small number of geometry shape parameters and that provides a broad range of geometric shapes with favorable aerodynamic and aerothermal properties. These properties can then be analyzed by optimization methods for desired performance. Optimization of the vehicle geometry shape parameters can be accomplished, for example, to minimize heating levels subject to constraints that reduce aerodynamic performance such as lift/drag be met, or to minimize weight of a thermal protection system, allowing greater payload. Other properties can be optimized or established as constraints on a geometric parameter search, such as a requirement that a minimum lift/drag be met or exceeded, while minimizing center of gravity offset from vehicle centerline, to ease packing of a working vehicle while in space operations. Because of these favorable properties the present invention provides considerable improvement over previous work.

DESCRIPTION OF BEST MODES OF THE INVENTION

Figure 1:
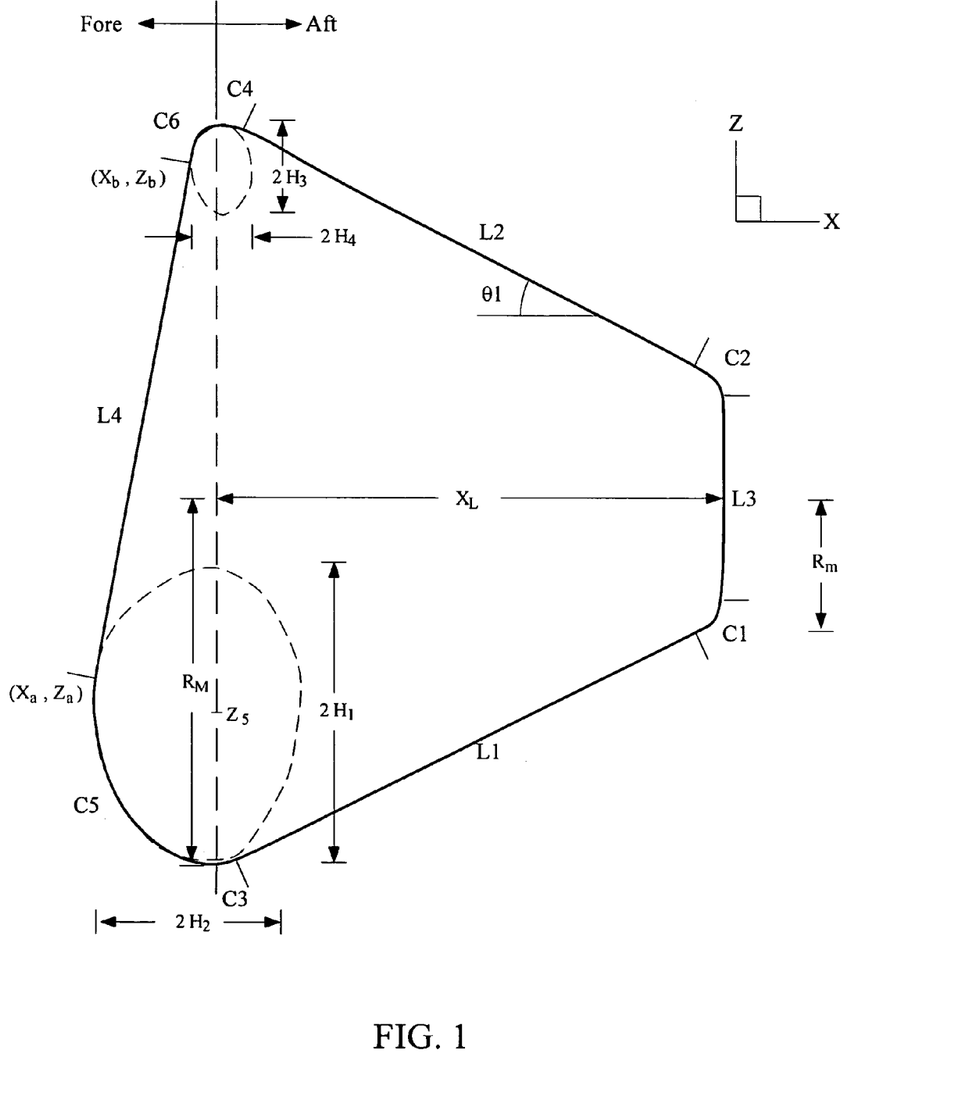
FIG. 1 is a cross sectional view of an embodiment of the inventive shape according to the invention.

FIG. 1 is a cross sectional view, in a central plane in an xz-plane of the structural shape Sh. The cross sectional shape $Sh_{xz}$, of a slice defined by the xz-plane, includes a longitudinal axis $L_x$ (x-axis), a fore-body section FORE and an aft section AFT, although the shape is not generally rotationally symmetric about the axis $L_x$. The cross section $Sh_{xz}$ of the aft-body section AFT includes first, second and third linear segments, L1, L2 and L3, first and second substantially identical curvilinear segments, C1 and C2, which are sectors of circles, and third and fourth substantially identical curvilinear segments, C3 and C4, which are sectors of circles, The first and second linear segments, L1 and L2, each make an angle $\theta_c$ relative to the x-axis $L_x$. The cross section of the fore-body includes the fifth and sixth curvilinear sectors, C5 and C6, and the fourth linear segment L4. The ellipses, C5 and C6 in the xz-plane are defined by the respective equations $$x^2/(H_1)^2+(z-z_5)^2/(H_2)^2=1, \quad (1\text{-}1)$$

$$z_5=H_2-R_M, \quad (2\text{-}1)$$

$$x^2/(H_3)^2+(z-z_6)^2/(H_4)^2=1, \quad (1\text{-}2)$$

$$z_6=-H_4+R_M, \quad (2\text{-}2)$$

where the x-axis length and z-axis length are $H_1$ and $H_2$ for the ellipse C5 and are $H_3$ and $H_4$, for the ellipse C6.

Figure 2:
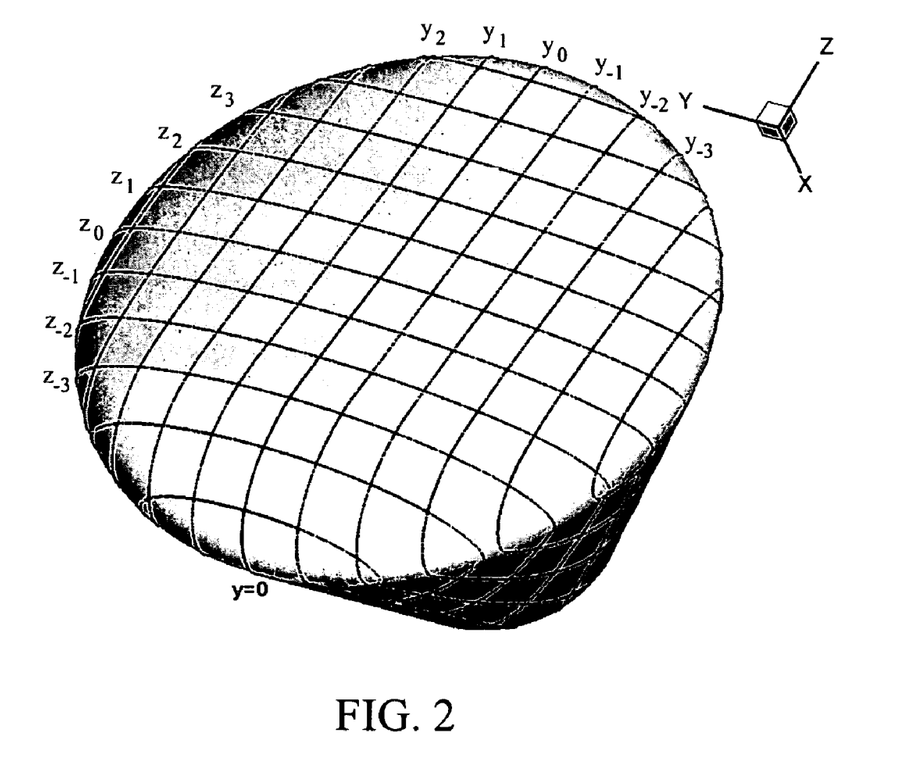
FIG. 2 is a three-dimensional view of the fore-body structure of FIG. 1, showing slices corresponding to y=constant and to z=constant.

FIG. 2 illustrates a sequence of cross sectional slices of the fore-body, taken parallel to the xz-plane and/or parallel to the xy-plane, at coordinate values $y=y_{n1}$ (n1=0, ±1, ±2, ... ±N), where $y=y_0=0$ corresponds to the xz-plane shown in FIG. 1, and at coordinate values $z=z_{n2}$. The physical extent of the fore-body, as shown by the slices in FIG. 2, can be defined by $$x = a(z, y) = a(z)\{1 - (y/R_z)^2\}^{1/2}, (-R_z \le y \le R_z, -R_M \le z \le R_M) \quad (3)$$

$$R_z = \{R_M^2 - z^2\}^{1/2}, \quad (4)$$

$$a(z) = H_1\{1 - (z - z_5)^2/(H_2)^2\}^{1/2} (-R_M \le z \le z_a), \quad (5\text{-}1)$$

$$= A(z - z_a) + B(z_a \le z \le z_b) \quad (5\text{-}2)$$

$$= H_3\{1 - (z - z_6)^2/(H_4)^2\}^{1/2} (z_b \le z \le +R_M), \quad (5\text{-}3)$$

where the vehicle shape has a maximum diameter, in the yz-plane, of $2R_M$ at x=0, and A and B are parameters determined in the following.

With reference to FIG. 1, the tangent line segment L4 is simultaneously tangent to the first ellipse C5 at $(x,z)=(x_a,z_a)$ and to the second ellipse C6 at $(x,z)=(x_b,z_b)$ and is defined by the relations $$x - x_a = m \cdot (z - z_a), \quad (6\text{-}1)$$

$$x - x_b = m \cdot (z - z_b), \quad (6\text{-}2)$$

$$m(\text{slope of } L4) = (x_a - x_b)/(z_a - z_b) \quad (7\text{-}1)$$

$$= \left(\frac{dx}{dz}\right)_a = (H_1^2/H_2^2)(z_a - z_1)/(x_a - x_1) \quad (7\text{-}2)$$

$$= \left(\frac{dx}{dz}\right)_b = (H_3^2/H_4^2)(z_b - z_2)/(x_b - x_2). \quad (7\text{-}3)$$

Once the coordinate $z_a$ (or $z_b$) is known, the coordinate $x_a$ (or $x_b$) is also known, and conversely, $$z'_a=(z_a-z_5)/H_1, \quad (8\text{-}1)$$

$$x_a=H_1\{1-z'^2_a\}^{1/2}, \quad (9\text{-}1)$$

$$z'_b=(z_b-z_6)/H_4. \quad (8\text{-}2)$$

$$x_b=H_3\{1-z'^2_b\}^{1/2}, \quad (9\text{-}2)$$

Equations. (6-2) and (6-3) can be re-expressed as $$z'^2_a=1-\{1+(H_2 \cdot H_3/H_1 \cdot H_4)^2\{z'^2_b/(1-z'^2_b)\}\}, \quad (10)$$

Equations. (6-1) and (6-2), with $(x,z)=(x_b,z_b)$, can be re-expressed as $$H_3\{1 - z'^2_b\}^{1/2} - H_1\{1 - z'^2_a\}^{1/2} = m\{H_4 \cdot z'_b - H_2 \cdot z'_a + z_2 - z_1\}, \quad (11)$$

$$m = \pm(H_1/H_2)z'_a/\{1 - z'^2_a\}^{1/2} = \pm(H_3/H_4)z'_b/\{1 - z'^2_b\}^{1/2}. \quad (12)$$

Equations (10), (11) and (12) can be solved simultaneously to determine $z'_a$ or $z'_b$, and thus to determine the quantities $A=(\pm)m$ and $B=a(z_a)=x_a$ (or $a(z_a)=x_b$).

Alternatively, the z values $z_a$ and $z_b$ can be determined with high accuracy using a numerical algorithm such as the following. The algorithm begins with a subroutine that determines a point (or two distinct points), if any, where a given line and a given ellipse intersect. Provide coordinates of a first initial point $(x_{1,n}, z_{1,n})$ on the first ellipse and coordinates of a second initial point $(x_{2,n}, z_{2,n})$ on the second ellipse, both arbitrary. First and second initial points might be $(x_{1,n}, z_{1,n})_{n=0} = (H_1, z_5)$ and $(x_{2,n}, z_2, n)n_{=0} = (H_3, z_6)$. Determine the equation of a line segment $L_{1,2;n}$ that passes through these two (initial) points, namely $$x = x_{1,n} + (x_{2,n} - x_{1,n})(z - z_{1,n})/(z_{2,n} - z_{1,n}) \quad (13\text{-}n)$$

Using the intersection subroutine, determine if the line described in Eq. (15) passes through one point, or through two distinct points, of each ellipse. If the line passes through one point for each ellipse, within a selected numerical error, the computation is done, and the single intersection point on each ellipse is the point of tangency for the fourth linear segment L4. If the line segment $L_{12,n}$ passes through two distinct points, $(x'_{1,n}, z'_{1,n})$ and $(x''_{1,n}, z''_{1,n})$, on the first ellipse, replace the point $(x_{1,n}, z_{1,n})$ by the point $(x_{1,n+1}, z_{1,n+1})$ where $$z_{1,n+1} = (z_{1,n} + z''_{1,n})/2, \quad (14\text{-}1)$$

$$x_{1,n+1} = H_2\{1 - (z_{1,n+1}/H_2)^2\}^{1/2}, \quad (14\text{-}2)$$

This process is repeated for the second ellipse to determine a new point $(x_{2,n+1}, z_{2,n+1})$ for the second ellipse, by analogy. A new line segment $L_{12;n+1}$ is determined as $$x = x_{1,n+1} + (x_{2,n+1} - x_{1,n+1})(z - z_{1,n+1})/(z_{2,n+1} - z_{1,n+1}), \quad (13\text{-}n+1)$$

and the procedure is repeated to determine the points $(x_{1,n+2}, z_{1,n+2})$ and $(x_{2,n+2}, z_{2,n+2})$. The overall procedure is found to converge much faster than in a normal binary manner, to the desired points of tangency, $(x_a, z_a)$ and $(x_b, z_b)$, on the first and second ellipses, respectively.

The fourth linear segment L4, shown in FIG. 1, can be replaced by a definition $$a(z) = H_1\{1 - (z - z_4)^2/(H_2)^2\}^{1/2} \quad (-z_M \leq z \leq z_a), \quad (15\text{-}1)$$

$$= P(z)(z_a \leq z \leq z_b) \quad (15\text{-}2)$$

$$= H_3\{1 - (z - z_4)^2/(H_4)^2\}^{1/2} (z_b \leq z \leq +z_M), \quad (15\text{-}3)$$

where $P(z)$ is a selected polynomial (preferably of degree 5 or higher) or trigonometric function that satisfies the following constraints:

$$(dP/dz)_{z=z'_a} = \pm(H_1/H_2)z'_a/\{1 - z'^2_a\}^{1/2}, \quad (16\text{-}1)$$

$$(dP/dz)_{z=z'_b} = \pm(H_3/H_4)z'_b/\{1 - z'^2_b\}^{1/2}. \quad (16\text{-}2)$$

$$P(z'_a) = H_1\{1 - (z_a - z_5)^2/H_2^2\}^{1/2}, \quad (16\text{-}3)$$

$$P(z'_B)H_3\{1(z_B - z_6)^2/H_4^2\}^{1/2}, \quad (16\text{-}4)$$

$$d^2P/dz^2 \leq 0 (z'_a \leq z \leq z'_b). \quad (16\text{-}5)$$

The last constraint, Eq. (16-5), which is satisfied by any linear segment and any quadratic segment with a non-positive second degree coefficient, ensures that the shape of the fore-body, projected on an xz-plane, is convex. The z-values, $z'_a$ and $z'_b$, determined from Eqs. (16-1)-(16-5), are likely to be different from those for Za and $z_b$ determined in Eqs. (10)-(12). In this instance, the fourth linear segment L4 is replaced by a seventh curvilinear segment C7 that extends between the fifth and sixth curvilinear segments (ellipses), as indicated in FIG. 1B.

In a first alternative, the linear function defining the fourth linear segment L4 (only) is replaced by a weighted sum $Sh(y, z)$ of one or more selected polynomials or trigonometric functions or other shape functions, $$Sh(y, z) = \sum_{N=1}^{N} w_n \cdot Sh_n(y, z) \quad (w_1 + \ldots + w_N = 1; N \geq 1), \quad (17)$$

to optimize according to a selected criterion, such as maximum lift/drag ratio for the vehicle. The points of tangency may be the shoulders, or points of maximum diameter $2R_M$. For example, the shape function $Sh_1(y,z)$ may be the combined segments C5, L4 and C6 discussed in the preceding.

The aft-body, shown in FIG. 1, is optionally a rotationally symmetric, truncated cone, having a maximum diameter of $2R_M$, having a minimum diameter of $2R_m$, and being defined by $$y^2 + z^2 = \{z_M - x \cdot \tan \theta_c\}, \quad (18)$$

$$\tan \theta_c = (R_M - R_m)/X_L \quad (19)$$

Figure 3A:
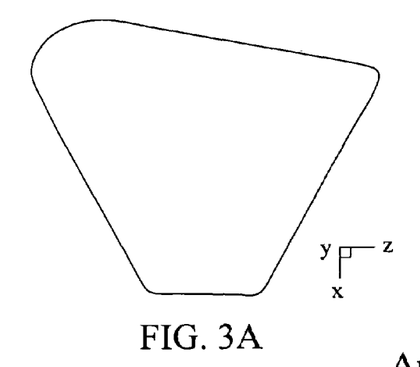
FIGS. 3A, 3B, 3C and 3D illustrate cross sectional shapes of a conventional re-entry vehicle and of an embodiment of the inventive shape.
Figure 3B:
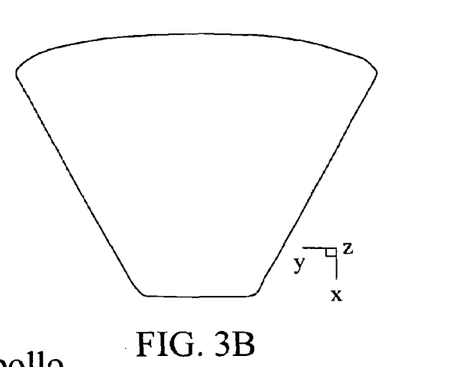
Figure 3C:
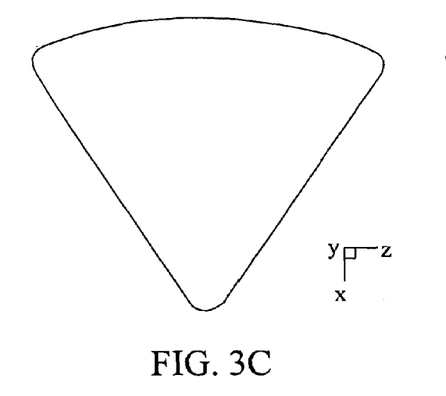
Figure 3D:
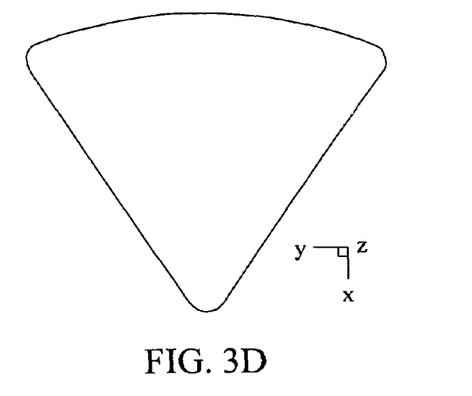

Nine parameter values are required to fully specify the inventive surface shown in FIG. 1 and in cross section in FIGS. 3A and 3B: $Z_M$, $X_L$, $\theta_c$ (or $R_m$), $R_3$, $R_4$, $H_1$, $H_2$, $H_3$ and $H_4$. By comparison, the shape referred to as the "Apollo shape" (shown in cross section in FIGS. 3C and 3D) requires the parameter values $z_M$, $X_L$, $\theta$, $R_3$, $R_4$ and an additional radius $R_{sp}$ for the spherical fore-body section. From an examination of the fore-body in FIGS. 1 and 3, it is clear that this section is not spherical.

Figure 4A:
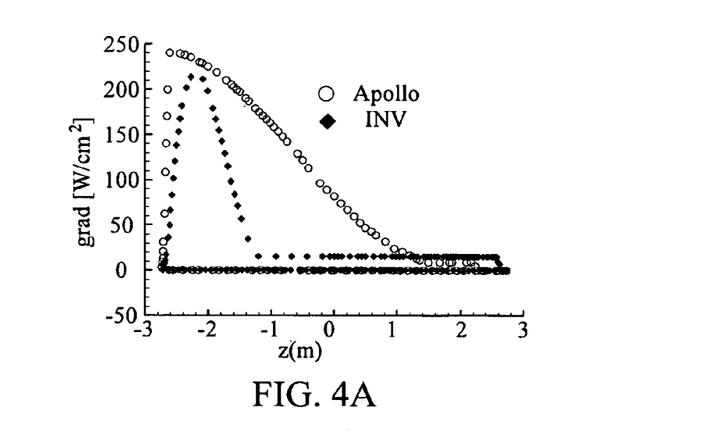
FIGS. 4A, 4B and 4C compare numerical estimates for shock radiation for the inventive shape and for an Apollo shape.

The non-symmetrical shape of the fore section in FIG. 1 introduces beneficial changes in heat transfer characteristics and pressure distributions. FIG. 4A graphically compares shock radiation q(rad;z) along a centerline (y=0) for a conventional shape ("Apollo") and for the inventive shape ("Inv") along the centerline, where z=0 is a baseline location shown in FIG. 1, and z<0 and z>0 represent various locations on either side of the baseline location, as indicated in FIG. 1. The centerline shock radiation q(rad;z) increases sharply to a maximum value near a wind-side shoulder (z≈−3) for both the Apollo shape and the inventive shape; but q(rad;z) for the Apollo shape decreases more slowly as z increases than does q(rad;z) for the inventive shape, corresponding to moving toward and through the aft-body. The centerline shock radiation q(rad;z) is thus always higher, often much higher, for the Apollo shape than for the inventive shape.

Figure 4B:
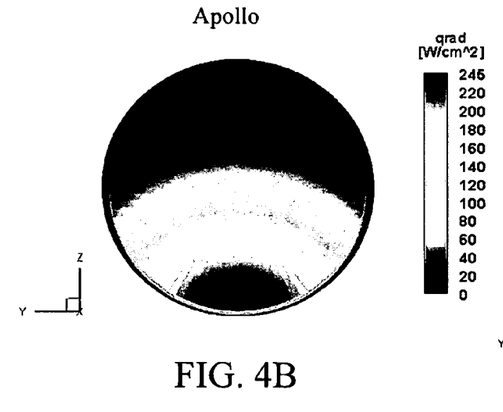
Figure 4C:
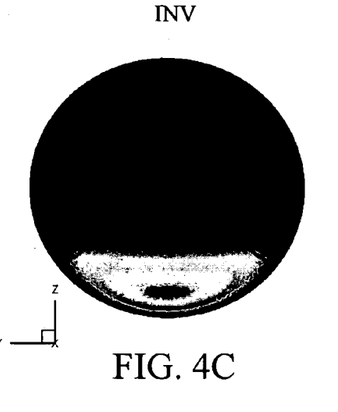

FIGS. 4B and 4C provide contours of numerical estimates for the shock radiation q(rad;y,z) to the surface of the fore-body, expressed in units of Watts/cm$^2$, for various values of the coordinates (y,z), for a reference re-entry situation (Mach no. 32.2; pressure 17.82 kPa; $\theta_c$=28° cone angle; angle of attack $\alpha$=26°; 5.5 meters diameter for the Apollo shape (FIG. 4B) and for the inventive shape disclosed here (FIG. 4C). The Apollo shape (FIG. 4B) has very high shoulder heating, where the fore-body and aft-body join. The significant shock radiation for the inventive shape is confined to a region of approximately 20 percent of the fore-body, with q(rad;y,z) values in a range 0-220 Watts/cm$^2$; whereas the Apollo shape results in increased shock radiation over about 40 percent, with q(rad;y,z) values in a range 0-245 Watts/cm$^2$.

Figure 5A:
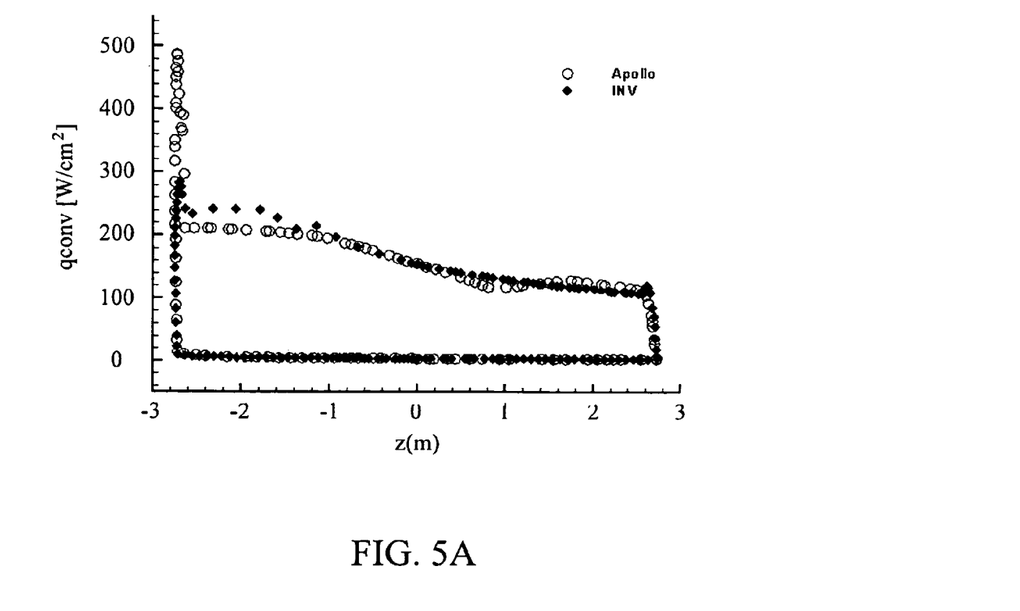
FIGS. 5A, 5B and 5C compare numerical estimates for laminar convective heating for the inventive shape and for an Apollo shape.

FIG. 5A graphically compares centerline convective heating q(conv;z), as a function of z, for the Apollo shape and for the inventive shape. The value q(conv;z) for the Apollo shape and for the inventive shape increase sharply to about 490 Watts/cm$^2$ and 290 Watts/cm$^2$, respectively, near the leading shoulder point (z≈−3), then sharply decrease to similar values as z ranges from z≈−2.6 to z ≈+2.8.

Figure 5B:
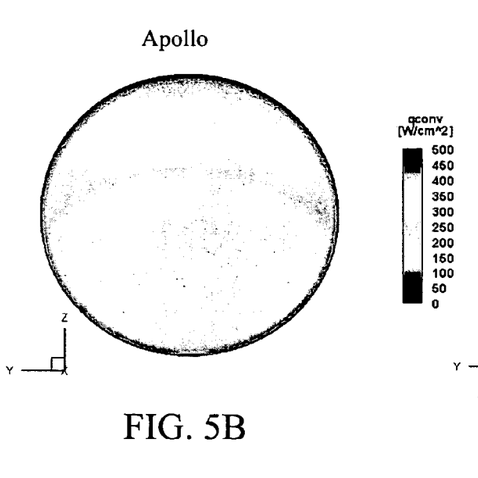
Figure 5C:
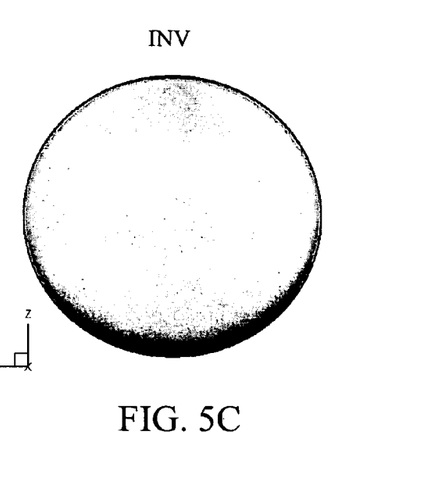

FIGS. 5B (Apollo shape) and 5C (inventive shape) provide contours of numerical estimates of laminar convective heating q(conv;y,z) in the fore-body for the two shapes: q(conv; y,z) for the two shapes has a range 0-490 Watts/cm² and 0-290 Watts/cm², respectively, with a similar distribution for the two shapes but with different maxima.

Figure 6A:
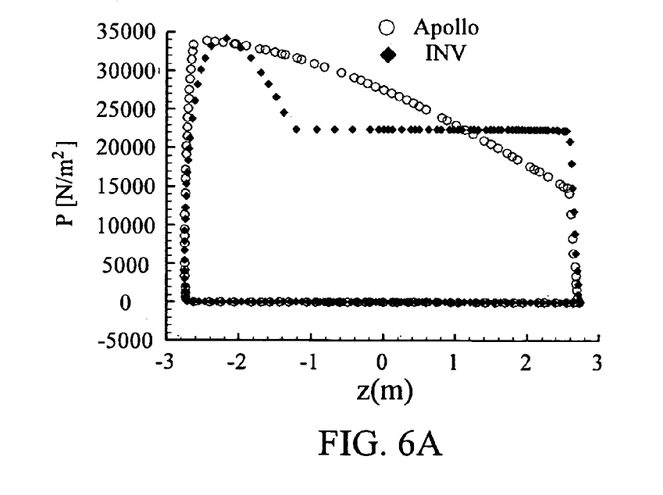
FIGS. 6A, 6B and 6C compare numerical estimates for laminar pressure and lift/drag ratio for the inventive shape and for an Apollo shape.
Figure 6B:
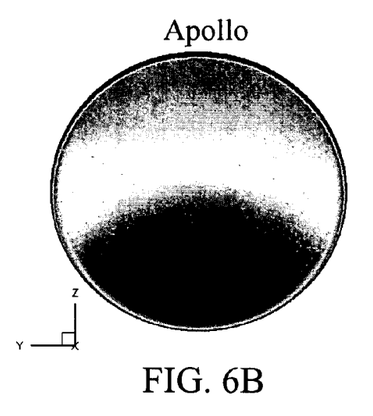
Figure 6C:
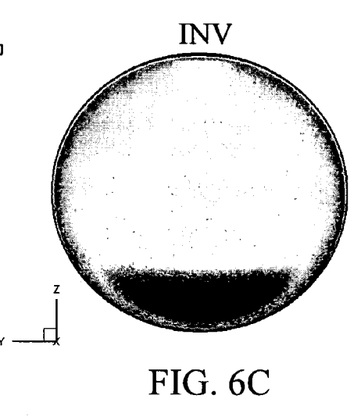

FIG. 6A graphically compares centerline surface pressure p1(surf;z) and p2(surf;z) for the Apollo shape and for the inventive shape for various values of the coordinate z. The Apollo shape pressure p1(surf;z) increases quickly from 0 to a maximum value of about 34,000 Newtons/m² near the lead point (z=−3), then decreases nearly linearly to about 14,000 N/m² at the other end of the perimeter (z+3). The inventive shape pressure p2(surf;z) increases approximately parabolically from 0 to about 34,000 N/m² at a location (z=−2) near but spaced apart from the lead point, then decreases approximately parabolically to a lower pressure value of about 20,000 N/m² at z=−1, remains approximately constant for $-1 \leq z \leq +2.6$, then decreases sharply to 0 at z=+2.8. FIGS. 6B and 6C provide contours of numerical estimates of laminar surface pressure, p1(surf;y,z) and p2(surf;y,z), for the Apollo shape and the inventive shape, respectively.

Figure 7:
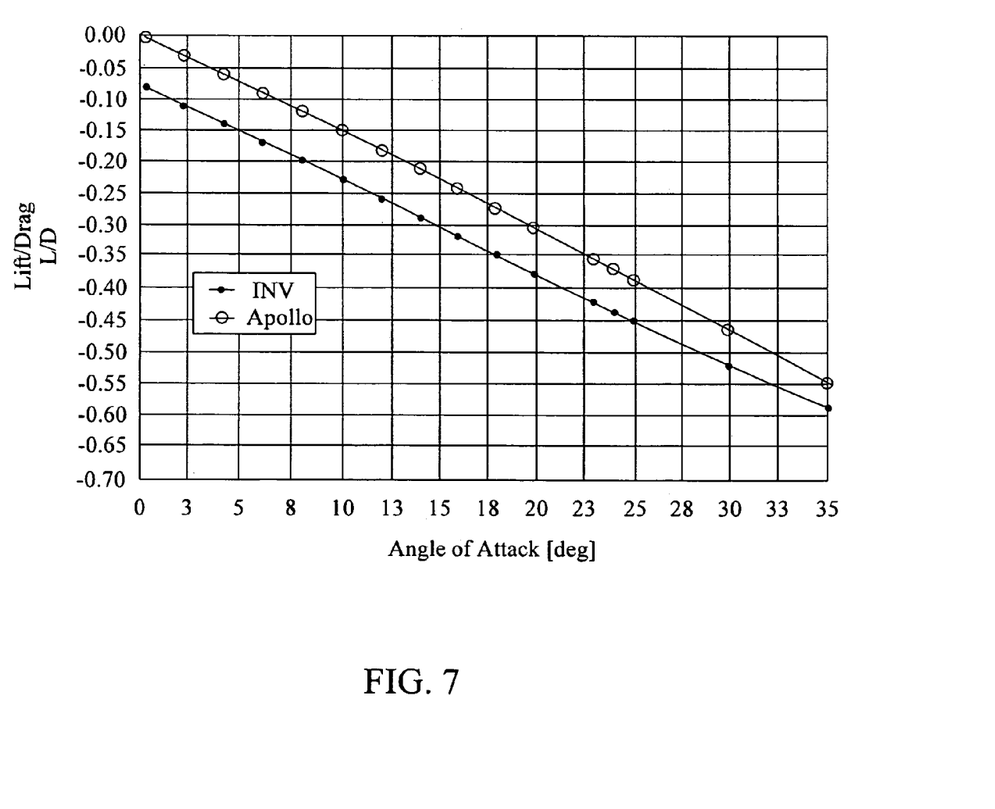
FIG. 7 graphically compares a computed lift/drag ratio for an Apollo shape and for the inventive shape

FIG. 7 graphically compares computed lift/drag (L/D) ratio for the inventive shape (INV) and the Apollo shape, for angles of attack α ranging from 0° to 35°. Note that the L/D ratio decreases approximately linearly with increase in the angle of attack α, and the L/D ratio for the inventive shape is uniformly higher than the L/D ratio for the Apollo shape.

The inventive shape appears to provide similar or substantially improved values for laminar convective heating, shock radiation and surface pressure (or lift/drag ratio) in the fore-body, relative to the Apollo shape.

What is claimed is:

1. A nose cone structure for a body entering an atmosphere, that provides enhanced aerodynamic and aerothermal performance, the structure comprising:
a convex shell having a longitudinally oriented x-axis and having a non-symmetric transverse cross sectional shape, when projected onto a plane parallel to an xz-plane of an (x,y,z) Cartesian coordinate, the shell comprising a fore-body and an aft-body joined to the fore-body, the aft-body having a projection on a yz-plane comprising:
first and second linear segments, spaced apart from each other at a first end of each segment by a selected distance of substantially $2R_m$ and located on opposite sides of the x-axis, with each of the first and second segments being oriented substantially at a selected non-zero angle $\theta_c$ relative to the x-axis and having a second segment end having a separation distance of substantially $R_M$ from the x-axis;
a third linear segment, oriented substantially perpendicular to the x-axis adjacent to the second end of each of the first and second linear segments;
first and second curvilinear segments, tangent to and joining the first and third linear segments, and tangent to and joining the second and third linear segments, respectively; and
a third curvilinear segment, having first and second ends, positioned tangent at the first end of the third curvilinear segment to the second end of the first linear segment;
a fourth curvilinear segment, having first and second ends, positioned tangent at the first end of the fourth curvilinear segment to the second end of the second linear segment; and
the fore-body having a projection on the yz-plane comprising:
a fifth curvilinear segment, having first and second ends, positioned tangent to a second end of the first linear segment at a fifth curvilinear segment first end;
a sixth curvilinear segment, having first and second ends, positioned tangent to a second end of the second linear segment at a sixth curvilinear segment first end; and
a fourth linear segment, having first and second ends, positioned tangent to the fifth curvilinear segment and tangent to the sixth curvilinear segment at the respective first and second ends of the fourth linear segment.

2. The structure of claim 1, wherein said first and second curvilinear segments are sectors of first and second circles having substantially equal radii.

3. The structure of claim 1, wherein said third and fourth curvilinear segments are sectors of third and fourth circles having substantially equal radii.

4. The structure of claim 1, wherein said fifth curvilinear segment comprises a section of a first ellipse, having a selected first major axis length and a selected first minor axis length.

5. The structure of claim 4, wherein said sixth curvilinear segment comprises a section of a second ellipse, having a selected second major axis length and a selected second minor axis length.

6. The structure of claim 4, wherein at least one of said angle $\theta_c$, said distance $2R_M$, said first major axis, said first minor axis, said second major axis and said second minor axis are chosen so that an aerodynamic lift force associated with said structure during re-entry of said structure into a selected atmosphere is at least equal to a selected threshold lift force.

7. The structure of claim 1, wherein;
said fifth curvilinear segment, projected on an xz-plane y=0, is substantially a portion of a first ellipse that is described by relations $x^2/(H_1)^2+(z-z_5)^2/(H_2)^2=1$, where $H_1$ and $H_2$ are selected lengths of a first semi-major axis and a first semi-minor axis of the first ellipse; and
said sixth curvilinear segment, projected on an xz-plane is substantially a portion of a second ellipse that is described by relations $x^2/(H_3)^2+(z-z_6)^2/(H_4)^2=1$, where $H_3$ and $H_4$ are selected lengths of a second semi-major axis and a second semi-minor axis of the second ellipse.

8. The structure of claim 1, wherein said fore-body shape is defined by relations $$x^2/a(z)^2 + (y^2+z^2)/R_M^2 = 1,$$
$$a(z) = H_1\{1-(z-z_5)^2/(H_2)^2\}^{1/2} (-R_M \leq z \leq z_a),$$
$$= A(z-z_1)+B (z_a \leq z \leq z_b)$$
$$= H_3\{1-(z-z_6)^2/(H_4)^2\}^{1/2} (z_b \leq z \leq R_M),$$
$$z_5 = -R_M + H_2,$$
$$z_6 = R_M - H_4,$$

where $R_M$ is a selected positive radius value, $H_1$ and $H_2$ are respective selected lengths of a semi-major axis and a semi-minor axis of a first ellipse, $H_3$ and $H_4$ are respective selected lengths of a semi-major axis and a semi-minor axis of a second ellipse, each coordinate pair, $(z_a,x_a)$ and $(z_b,x_b)$, lies on said fourth linear segment, and A and B are selected constant values for said fourth linear segment.

9. The structure of claim 8, wherein $A=m=(x_b-x_a)/(z_b-z_a)$ is a slope of said fourth linear segment with respect to said z-axis and B is chosen to be said value $x_a$ and $z_1=z_a$.

10. The structure of claim 8, wherein $A=m=(x_b-x_a)/(z_b-z_a)$ is a slope of said fourth linear segment with respect to said z-axis and B is chosen to be said value $x_b$ and $z_1=z_b$.

11. The structure of claim 1, wherein said aft-body comprises a substantially cylindrically symmetric, having a maximum diameter of substantially $2R_M$, a length $x_L$, and being defined substantially by the relations $$y^2+z^2=\{R_M-x\cdot\tan\theta_c\}^2, (0\leq x\leq x_L)$$

$$\tan\theta_c=(R_M-R_m)/x_L.$$

12. The structure of claim 1, wherein, for $-R_M\leq z\leq R_M$ and $-R_z\leq y\leq R_z$ with $R_z=\{R_M^2-Z^2\}^{1/2}$, said fore-body has an extent in said x-coordinate direction given by $0\leq x\leq a(z)\{1-(y/R_z)^2\}^{1/2}$.

13. The structure of claim 1, wherein, for $-R_M\leq z\leq R_M$ and $-R_z\leq y<R_z$ with $R_z=\{R_M^2-Z^2\}^{1/2}$, said fore-body has an extent in said x-coordinate direction given by $x=w(y,z)\cdot a(R_{yz})+(1-w(y,z))a(-R_{yz})$, with $R_{yz}\{y^2+z^2\}^{1/2}$, where $w(y,z)$ is a selected weight function having a domain of $-R_M\leq z\leq R_M$ and $-R_z\leq y\leq R_z$ and a range of $[0,1]$, and $a(z)$ is the extent of said fore-body at $y=0$ in the x-coordinate direction.

14. The structure of claim 1, wherein at least one of said fourth linear segment, said fifth curvilinear segment and said sixth curvilinear segment is replaced by a function $P(z)$ that is at least one of a polynomial and a trigonometric function satisfying the following conditions:

$$(dP/dz)_{z=z'_a}=(H_1/H_2)z'_a/\{1-z'^2_a\}^{1/2},$$

$$(dP/dz)_{z=z'_b}=(H_3/H_4)z'_b/\{1-z'^2_b\}^{1/2}.$$

$$P(z'_a)=H_1\{1-z'^2_a\}^{1/2},$$

$$P(z'_b)=H_1\{1-z'^2_b\}^{1/2},$$

$$z'_a=(z_a-z_5)?H_2,$$

$$z'_b=(z_b-z_6)?H_4,$$

$$d^2P/dz^2<0(z'_A\leq z\leq z'_B),$$

where $z_a$ and $z_b$ are selected values of said coordinate z.

15. The structure of claim 1, wherein said aft-body projection on said yz-plane is determined by a weighted sum $S(z)$ ($-R_M\leq z\leq R_M$) of (i) a combination of said fifth curvilinear segment C5, said fourth linear segment L4 and said sixth curvilinear segment C6 and (ii) a selected polynomial or trigonometric function $P(z)$, having respective weights w and $1-w$, where the sum $S(z)$ is tangent to said second end of said third curvilinear segment and is tangent to said second end of said fourth curvilinear segment, respectively.

16. A nose cone structure for a body entering an atmosphere, that provides enhanced aerodynamic and aerothermal performance, the structure comprising:

a convex shell having a longitudinally oriented x-axis and having a non-symmetric transverse cross sectional shape, when projected onto a plane parallel to an xz-plane of an (x,y,z)) Cartesian coordinate, the shell comprising a fore-body and an aft-body joined to the fore-body, the aft-body having a projection on a yz-plane comprising:

first and second linear segments, spaced apart from each other at a first end of each segment by a selected distance of substantially $2R_m$ and located on opposite sides of the x-axis, with each of the first and second segments being oriented substantially at a selected non-zero angle $\theta_c$ relative to the x-axis and having a second segment end having a separation distance $R_M$ from the x-axis;

a third linear segment, oriented substantially perpendicular to the x-axis adjacent to the second end of each of the first and second linear segments;

first and second curvilinear segments, tangent to and joining the first and third linear segments, and tangent to and joining the second and third linear segments, respectively; and a third curvilinear segment, having first and second ends, positioned tangent at the first end of the third curvilinear segment to the second end of the first linear segment;

a fourth curvilinear segment, having first and second ends, positioned tangent at the first end of the fourth curvilinear segment to the second end of the second linear segment; and the fore-body having a projection on the yz-plane comprising a sum of one or more shape functions, each shape function being a selected polynomial or a selected trigonometric function, where the sum positioned is tangent to a second end of the first linear segment at a first end of the shape function, and is positioned tangent to a second end of the second linear segment at a second end of the shape function.

\* \* \* \* \*